US012444997B2

(12) United States Patent
Katsuya

(10) Patent No.: US 12,444,997 B2
(45) Date of Patent: Oct. 14, 2025

(54) CONTACTLESS ELECTRIC POWER TRANSMISSION SYSTEM

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/582,711

(22) Filed: Feb. 21, 2024

(65) Prior Publication Data
US 2024/0322612 A1  Sep. 26, 2024

(30) Foreign Application Priority Data

Mar. 20, 2023  (JP) ................. 2023-044296

(51) Int. Cl.
*H02J 50/80* (2016.01)
*H02J 50/12* (2016.01)
*B60L 53/122* (2019.01)

(52) U.S. Cl.
CPC .............. *H02J 50/80* (2016.02); *H02J 50/12* (2016.02); *B60L 53/122* (2019.02)

(58) Field of Classification Search
CPC ....................................... H02J 50/80
USPC ........................................... 307/104
See application file for complete search history.

(56) References Cited

U.S. PATENT DOCUMENTS

| | | | |
|---|---|---|---|
| 2011/0309688 A1* | 12/2011 | Yamazaki | H02J 50/40 307/104 |
| 2013/0203355 A1 | 8/2013 | Ootani | |
| 2015/0162755 A1 | 6/2015 | Inoue et al. | |

FOREIGN PATENT DOCUMENTS

| | | |
|---|---|---|
| CN | 112406569 | 2/2021 |
| CN | 115056666 | 9/2022 |
| JP | 2013-247807 | 12/2013 |
| JP | 2014-064414 | 4/2014 |

(Continued)

OTHER PUBLICATIONS

Japanese Office Action for Japanese Patent Application No. 2023-044296 mailed Oct. 15, 2024.

*Primary Examiner* — Joseph Chang
(74) *Attorney, Agent, or Firm* — Amin, Turocy & Watson, LLP

(57) ABSTRACT

A contactless electric power transmission system includes an electric power reception device and a control device. The electric power reception device receives electric power transmitted in a contactless manner between the electric power reception device and an electric power transmission device. The control device sets, in a coupling zone in which a coupling degree between a primary side coil of the electric power transmission device and a secondary side coil of the electric power reception device is equal to or more than a predetermined degree, a communication zone in which the coupling degree is relatively small, and an electric power transmission zone in which the coupling degree is relatively large. The control device transmits information relating to electric power transmission in the electric power transmission zone from the electric power reception device to the electric power transmission device by communication between the electric power transmission device and the electric power reception device when the secondary side coil is present in a foremost communication zone of the coupling zone.

8 Claims, 7 Drawing Sheets

(56) References Cited

FOREIGN PATENT DOCUMENTS

WO 2009/014125 1/2009
WO 2012/053203 4/2012

\* cited by examiner

CONTACTLESS ELECTRIC POWER TRANSMISSION SYSTEM

CROSS-REFERENCE TO RELATED APPLICATION

Priority is claimed on Japanese Patent Application No. 2023-044296, filed on Mar. 20, 2023, the contents of which are incorporated herein by reference.

BACKGROUND

Field of the Invention

The present invention relates to a contactless electric power transmission system.

Background

In recent years, in order to ensure that more people have access to affordable, reliable, sustainable, and advanced energy, research and development relating to charging and electric power supply in a vehicle on which a secondary battery is mounted, which contributes to energy efficiency, has been conducted.

In the related art, in a contactless electric power transmission system that supplies electric power to a vehicle from the exterior of the vehicle by contactless electric power transmission, a system is known in which communication between an electric power transmission side and an electric power reception side is performed by superimposing a communication signal on an electric power supply signal transmitted from the electric power transmission side to the electric power reception side (for example, refer to Japanese Unexamined Patent Application, First Publication No. 2013-247807).

SUMMARY

In techniques relating to charging and electric power supply in a vehicle on which a secondary battery is mounted, when contactless electric power transmission to a traveling vehicle is performed, the time required for the vehicle to pass through an electric power transmission side coil provided on a travel path is an extremely short time of about 0.01 seconds. Thereby, for example, in the contactless electric power transmission system of the related art described above or the like, an abnormality that the vehicle passes through the electric power transmission side coil before communication between the electric power transmission side and the electric power reception side is established, an abnormality that electric power transmission is not established since the communication between the electric power transmission side and the electric power reception side is not stabilized, an abnormality that excessive electric power is supplied, or the like may occur.

An aspect of the present invention aims to provide a contactless electric power transmission system capable of performing appropriate electric power transmission by independent communication control and independent electric power control at an electric power reception side. Further, the aspect of the present invention contributes to energy efficiency.

A contactless electric power transmission system according to a first aspect of the present invention includes: an electric power reception device having an electric power reception side coil that receives electric power transmitted in a contactless manner between the electric power reception side coil and an electric power transmission side coil of an electric power transmission device; and a control device that controls the electric power reception device, wherein the control device sets, in a coupling zone in which a coupling degree between the electric power transmission side coil and the electric power reception side coil is equal to or more than a predetermined degree, a communication zone in which the coupling degree is relatively small, and an electric power transmission zone in which the coupling degree is relatively large, and transmits information relating to electric power transmission in the electric power transmission zone from the electric power reception device to the electric power transmission device by communication between the electric power transmission device and the electric power reception device when the electric power reception side coil is present in a foremost communication zone of the coupling zone.

A second aspect is the contactless electric power transmission system according to the first aspect described above, wherein the control device may set a timing of the communication between the electric power transmission device and the electric power reception device in the communication zone in accordance with a movement state of the electric power reception side coil.

A third aspect is the contactless electric power transmission system according to the first or second aspect described above, wherein the control device may set the information relating to the electric power transmission to have at least key information and information about a request frequency of the electric power transmission and may cause the electric power transmission device to perform, in the electric power transmission zone, the electric power transmission at the request frequency in response to verification of the key information by transmitting the information relating to the electric power transmission from the electric power reception device to the electric power transmission device in the foremost communication zone.

A fourth aspect is the contactless electric power transmission system according to the third aspect described above which may include: a communication device in which communication with a communicator arranged externally is controlled by the control device, wherein the control device may shift the electric power transmission device from a stop state to a reception standby state of the information relating to the electric power transmission by acquiring the key information by the communication between the communicator and the communication device before the electric power reception side coil arrives at the coupling zone and may maintain the reception standby state for a period of time until verification of the key information is completed.

A fifth aspect is the contactless electric power transmission system according to the fourth aspect described above, wherein the control device may set the reception standby state to a short-circuit state of the electric power transmission side coil, and in the communication between the electric power transmission device and the electric power reception device, communication may be performed by a voltage induced in the electric power transmission side coil by a magnetic field generated in the electric power reception side coil by an electric power distribution switch operation of the electric power reception device.

According to the first aspect described above, by including the control device that transmits the information relating to the electric power transmission from the electric power reception device to the electric power transmission device in the communication zone prior to arriving at the electric power transmission zone, it is possible to ensure desired electric power and transmission efficiency. For example, even when the time to pass through the electric power transmission zone is short since the speed of a movable body on which the electric power reception device is mounted is high, the control device can promptly start the electric power transmission in the electric power transmission zone by transmitting the information relating to the electric power transmission prior to arriving at the electric power transmission zone.

In the case of the second aspect described above, since the control device sets the timing (a cycle, a frequency, and the like) of the communication in the communication zone in accordance with the movement state such as the speed of a movable body on which the electric power reception device is mounted, the communication can be appropriately completed in the communication zone, and it is possible to prevent an increase of electric power consumption by preventing an excessive number of communications from being performed.

In the case of the third aspect described above, by including the control device that transmits the information about the request frequency of the electric power transmission to the electric power transmission device, it is possible to ensure desired electric power and transmission efficiency. For example, even when a coupling coefficient is decreased due to a minimum ground height of the vehicle, the mounting layout of the electric power reception device, and the like, which are related to a distance between the electric power transmission side coil and the electric power reception side coil, by a request frequency which offsets the variation of a mutual inductance, it is possible to prevent a decrease of the electric power and the transmission efficiency.

In the case of the fourth aspect described above, by including the control device that shifts the electric power transmission device to the reception standby state prior to arriving at the coupling zone, it is possible to promptly perform reception and verification of the key information in the communication zone. The electric power transmission device is in the stop state before the control device acquires the key information, and thereby, it is possible to prevent the increase of standby electric power.

In the case of the fifth aspect described above, the communication of the information by the electric power transmission from the electric power reception device to the electric power transmission device can be detected by the voltage and the current of the electric power transmission side coil. By performing the communication by the electric power reception side coil and the electric power transmission side coil, it is possible to simplify the configuration of a system, for example, compared to the case in which an additional communication device is provided on each side or the like.

DESCRIPTION OF EMBODIMENTS

Figure 1:
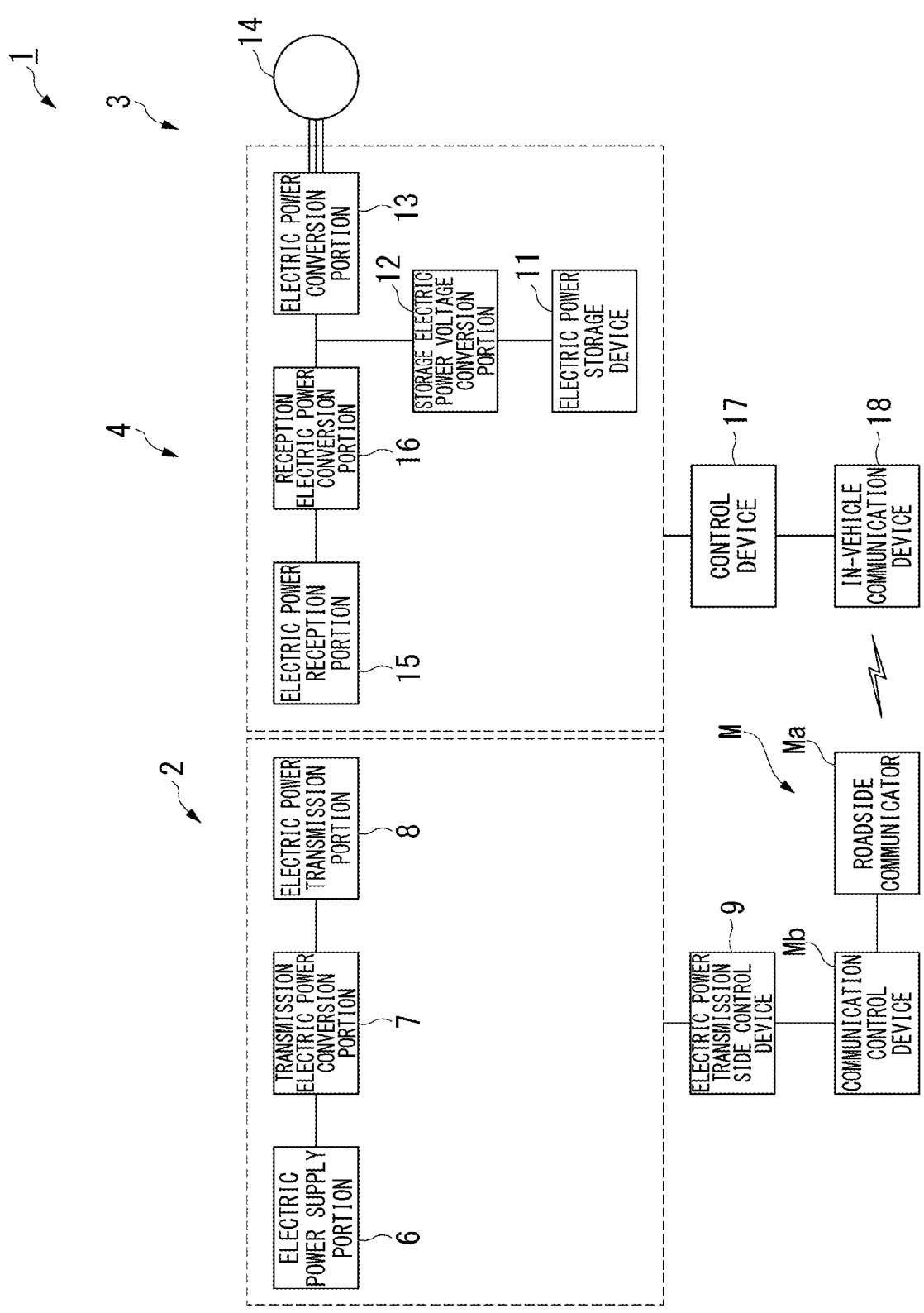
FIG. 1 is a view showing a configuration of a contactless electric power transmission system in an embodiment of the present invention.
Figure 2:
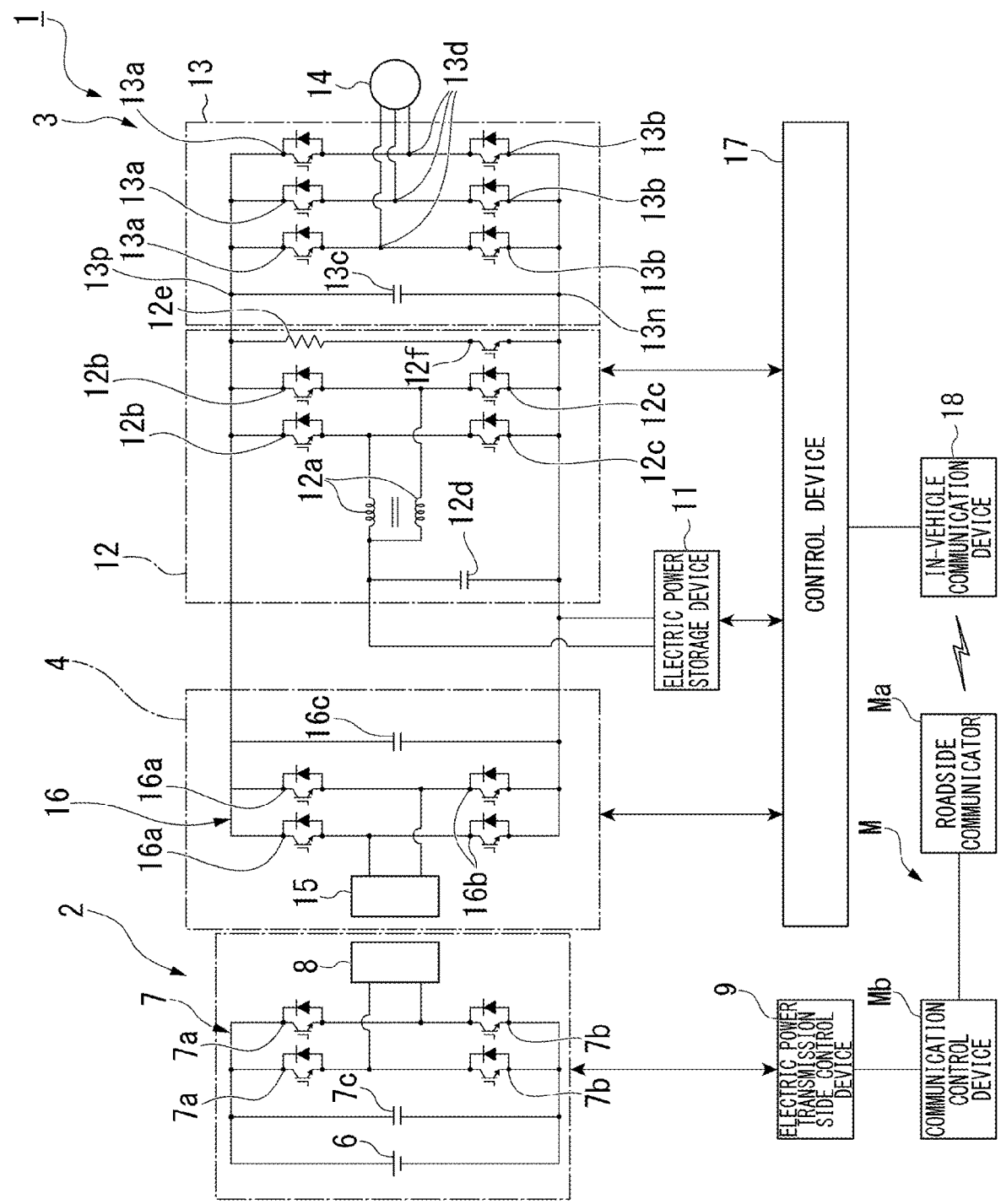
FIG. 2 is a view showing details of the configuration of the contactless electric power transmission system of the embodiment of the present invention.
Figure 3:
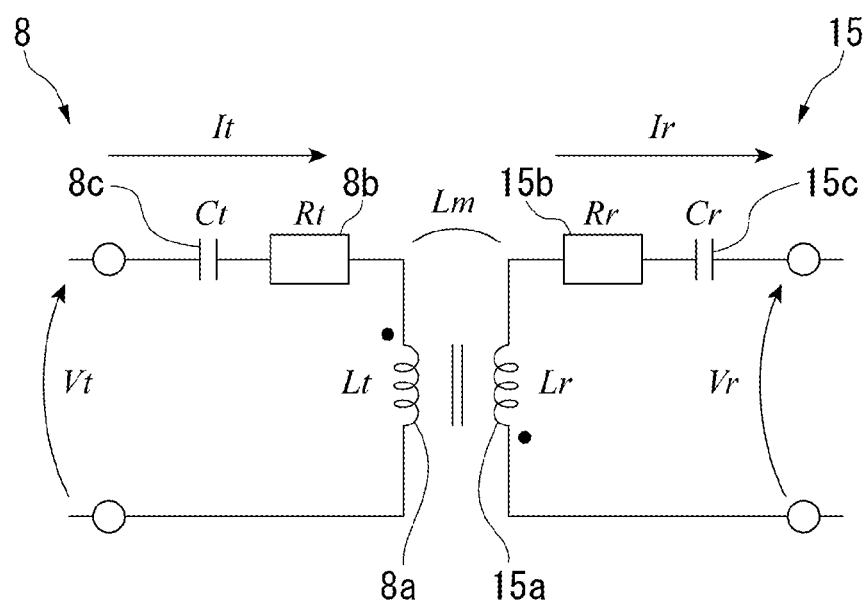
FIG. 3 is a view showing a configuration of an electric power transmission portion and an electric power reception portion of the contactless electric power transmission system in the embodiment of the present invention.

Hereinafter, a contactless electric power transmission system according to an embodiment of the present invention will be described with reference to the drawings. FIG. 1 and FIG. 2 are views showing a configuration of a contactless electric power transmission system 1 of the embodiment. FIG. 3 is a view showing a configuration of an electric power transmission portion 8 and an electric power reception portion 15 of the contactless electric power transmission system 1 in the embodiment.

The contactless electric power transmission system 1 of the embodiment supplies electric power, for example, from the exterior of a movable body such as a vehicle to the movable body by contactless electric power transmission. Examples of the vehicle include electric vehicles such as electric automobiles, hybrid vehicles, and fuel cell vehicles.

(Contactless Electric Power Transmission System)

As shown in FIG. 1 and FIG. 2, the contactless electric power transmission system 1 of the embodiment includes, for example: an electric power transmission device 2 provided on a travel path or the like of a vehicle; a drive control device 3 and an electric power reception device 4 that are mounted on a movable body such as a vehicle; and a communication system M. The contactless electric power transmission system 1 of the embodiment may include at least configuration elements (for example, the drive control device 3 and the electric power reception device 4) mounted on the movable body, and the contactless electric power transmission may be performed by the combination of a configuration element (for example, the electric power transmission device 2 and the communication system M) outside the movable body and the contactless electric power transmission system 1 mounted on the movable body.

The communication system M includes, for example, at least one roadside communicator Ma and a communication control device Mb. The communication system 1 constitutes, for example, at least part of a system that electronically collects a toll such as an ETC (Electronic Toll Collection System) on a toll road.

The roadside communicator Ma is arranged, for example, on a travel road or the like of the vehicle on an upstream side of a coupling zone (a communication zone and an electric power transmission zone) described later to be separated by a predetermined distance from the coupling zone. The roadside communicator Ma includes an antenna for wireless communication or the like and communicates wirelessly with an in-vehicle communication device 18 described later that is mounted on a movable body such as a vehicle. For example, when acquiring, from the in-vehicle communication device 18, information required for billing and payment for electric power transmission from the electric power transmission device 2 to the movable body such as a vehicle, the roadside communicator Ma transmits key information required for starting the electric power transmission and information relating to the arrangement of the electric power transmission device 2 to the in-vehicle communication device 18. The information required for billing and payment is information specific to the movable body such as a vehicle which is, for example, the presence or absence of a toll collection IC card, an in-vehicle transponder, or the like and an identifier. The key information is, for example, information generated while being updated on a predetermined cycle so as to be different for each authorized movable body (that is, a vehicle authorized to perform electric power transmission or the like) that passes through a predetermined electric power transmission zone. The key information is information required for the electric power transmission device 2 to authenticate the electric power reception device 4 described later of the movable body such as a vehicle. The information relating to the arrangement of the electric power transmission device 2 is, for example, information about an arrangement interval of a plurality of electric power transmission portions 8 described later or the like.

The communication control device Mb controls operations of all roadside communicators Ma that are associated with the communication control device Mb in advance. The communication control device Mb is, for example, a software function unit that functions by a predetermined program being executed by a processor such as a CPU (Central Processing Unit). The software function unit is an ECU that includes the processor such as a CPU, a ROM (Read-Only Memory) that stores the program, a RAM (Random-Access Memory) that temporarily stores data, and an electronic circuit such as a timer. At least part of the communication control device Mb may be an integrated circuit such as a LSI (Large-Scale Integration).

For example, the communication control device Mb attempts to acquire the information required for billing and payment by the communication between the roadside communicator Ma and the in-vehicle communication device 18 of a movable body such as a peripheral vehicle on a predetermined cycle or the like. When the communication control device Mb acquires the information required for billing and payment from the in-vehicle communication device 18 and confirms that electronic payment is possible, the communication control device Mb transmits authorization information indicating that electronic payment is possible and key information required for starting electric power transmission to the in-vehicle communication device 18. When the key information is transmitted from the roadside communicator Ma to the in-vehicle communication device 18, the communication control device Mb transmits the identical key information to an electric power transmission side control device 9 described later.

The electric power transmission device 2 includes, for example, an electric power supply portion 6, a transmission electric power conversion portion 7, the electric power transmission portion 8, and the electric power transmission side control device 9. The electric power transmission device 2 may include, for example, at least a plurality of electric power transmission portions 8 in a predetermined coupling zone on the travel path or the like of the vehicle.

The electric power supply portion 6 includes, for example, an AC electric power supply such as a commercial electric power supply, an AC-DC converter that converts AC electric power into DC electric power, and a capacitor for smoothing electric power. The electric power supply portion 6 converts AC electric power supplied from the AC electric power supply into DC electric power by the AC-DC converter.

The transmission electric power conversion portion 7 includes, for example, an inverter that converts DC electric power into AC electric power. The inverter of the transmission electric power conversion portion 7 includes, for example: a bridge circuit formed of a plurality of switching elements connected in two phases by bridge connection and a rectifier element; and a capacitor for smoothing a voltage. Each switching element is, for example, a transistor such as a SiC (Silicon Carbide) MOSFET (Metal-Oxide-Semiconductor Field-Effect Transistor). The plurality of switching elements are high-side arm and low-side arm transistors 7a, 7b that form a pair in each phase. The rectifier element is, for example, a reflux diode connected in parallel to each transistor 7a, 7b. A capacitor 7c for smoothing a voltage is connected in parallel to the bridge circuit.

The electric power transmission portion 8 transmits electric power by a change in the high-frequency magnetic field, for example, by magnetic field coupling such as magnetic field resonance or electromagnetic induction. As shown in FIG. 3, the electric power transmission portion 8 includes, for example, a resonance circuit formed of a primary side coil 8a (electric power transmission side coil), a primary side resistance 8b, and a primary side capacitor 8c that are connected in series. The electric power transmission portion 8 includes, for example, a sensor such as a current sensor that detects a current It flowing through the resonance circuit.

The electric power transmission side control device 9 integrally controls the electric power transmission device 2. The electric power transmission side control device 9 is, for example, a software function unit that functions by means of a predetermined program being executed by a processor such as a CPU (Central Processing Unit). The software function unit is an ECU that includes a processor such as a CPU, a ROM (Read-Only Memory) that stores the program, a RAM (Random-Access Memory) that temporarily stores data, and an electronic circuit such as a timer. At least part of the electric power transmission side control device 9 may be an integrated circuit such as a LSI (Large-Scale Integration).

For example, the electric power transmission side control device 9 performs electric power transmission to the electric power reception device 4 of the vehicle by controlling switching between ON (conduction) and OFF (cutoff) of each switching element of the transmission electric power conversion portion 7 in response to information about a drive frequency set in advance or a request frequency received from the electric power reception device 4.

For example, when receiving the key information from the communication control device Mb, the electric power transmission side control device 9 understands that the identical key information is transmitted from the roadside communicator Ma to the in-vehicle communication device 18 of a movable body and shifts the electric power transmission device 2 from a stop state to a reception standby state. The stop state of the electric power transmission device 2 is, for example, a state of stopping a switching operation in the transmission electric power conversion portion 7 such as maintaining each switching element of the transmission electric power conversion portion 7 in OFF (cutoff). The reception standby state of the electric power transmission device 2 is a state of detecting information transmission from the electric power reception device 4 of the movable body such as a vehicle. The reception standby state of the electric power transmission device 2 is, for example, a short-circuit state of the transmission electric power conversion portion 7.

In the short-circuit state of the transmission electric power conversion portion 7, the electric power transmission side control device 9 short-circuits the primary side coil 8a by setting the low-side arm transistor 7b of each phase to ON. Thereby, when looking at the electric power transmission device 2 on the primary side from the electric power reception device 4 on the secondary side, an impedance on the primary side becomes an extremely large value. However, when a magnetic field is generated by the secondary side coil 15a of the electric power reception device 4 at the time of transmission of a PING described later, communication from the electric power reception device 4 is detected by a voltage induced in the primary side coil 8a of the electric power transmission device 2.

For example, when the key information and information about the request frequency or the like of electric power transmission are received from the electric power reception device 4, the electric power transmission side control device 9 performs verification between the key information received from the communication control device Mb and the key information received from the electric power reception device 4. When the key information matches, the electric power transmission side control device 9 shifts the electric power transmission device 2 from the reception standby state to an electric power transmission state. The electric power transmission state of the electric power transmission device 2 is, for example, a state of performing electric power transmission at the request frequency of the electric power reception device 4.

As shown in FIG. 1 and FIG. 2, the drive control device 3 of the movable body such as a vehicle includes, for example, an electric power storage device 11, a storage electric power voltage conversion portion 12, an electric power conversion portion 13, and a rotary electric machine 14. The electric power reception device 4 of the movable body includes, for example, the electric power reception portion 15 and a reception electric power conversion portion 16. The drive control device 3 and the electric power reception device 4 include, for example, a common control device 17. The control device 17 includes, for example, the in-vehicle communication device 18.

For example, in the case of an electric automobile or the like that is driven using the electric power storage device 11 as a power source, the drive control device 3 may not include the storage electric power voltage conversion portion 12. For example, in the case of a hybrid vehicle or the like that is driven using the electric power storage device 11 and an internal combustion engine as a power source, the drive control device 3 may include the storage electric power voltage conversion portion 12.

The electric power storage device 11 is connected to the storage electric power voltage conversion portion 12. The electric power storage device 11 is charged by electric power transmitted in a contactless manner from the electric power transmission device 2 outside the vehicle. The electric power storage device 11 performs transmission and reception of electric power with the rotary electric machine 14 via the storage electric power voltage conversion portion 12 and the electric power conversion portion 13.

The electric power storage device 11 includes, for example, a battery such as a lithium-ion battery, a current sensor that detects a current of the battery, and a voltage sensor that detects a voltage of the battery.

For example, in an electric automobile or the like, when the storage electric power voltage conversion portion 12 is not provided, the electric power storage device 11 is connected to the electric power conversion portion 13 and the reception electric power conversion portion 16 described later.

The storage electric power voltage conversion portion 12 is connected to the electric power conversion portion 13 and the reception electric power conversion portion 16. The storage electric power voltage conversion portion 12 includes, for example, a voltage controller that performs a bi-directional voltage conversion of increasing the voltage and decreasing the voltage.

The voltage controller converts input electric power and output electric power at the time of charging and discharging of the electric power storage device 11 by the bi-directional voltage conversion. The voltage controller of the storage electric power voltage conversion portion 12 includes, for example, a pair of first reactors, a first element module, and a capacitor for smoothing a voltage.

A pair of first reactors 12a, 12a form a composite reactor by being magnetically coupled to each other at opposite polarity. The pair of first reactors 12a, 12a are connected to a connection point between a high-side arm and a low-side arm of each phase of the first element module.

The first element module includes, for example, a first bridge circuit formed of a plurality of switching elements connected in two phases by bridge connection and a rectifier element. Each switching element is, for example, a transistor such as a SiC MOSFET. The plurality of switching elements are high-side arm and low-side arm transistors 12b, 12c that form a pair in each phase. The rectifier element is, for example, a reflux diode connected in parallel to each transistor 12b, 12c. The capacitor 12d for smoothing a voltage is connected in parallel to the electric power storage device 11.

The storage electric power voltage conversion portion 12 includes a resistance 12e and a transistor 12f that are connected in series. The resistance 12e and the transistor 12f are connected in parallel to the first bridge circuit.

The pair of first reactors 12a, 12a and the first element module of the voltage controller perform voltage conversion by so-called two-phase interleaving. In the two-phase interleaving, one cycle of a switching control of a first-phase transistor 12b, 12c of two-phase transistors 12b, 12c connected to the pair of first reactors 12a, 12a and one cycle of a switching control of a second-phase transistor 12b, 12c are displaced from each other by half a cycle.

The electric power conversion portion 13 is connected to the rotary electric machine 14. The electric power conversion portion 13 includes, for example, an electric power converter that performs conversion between DC electric power and AC electric power. The electric power converter includes, for example, a second element module and a capacitor for smoothing a voltage.

The second element module includes, for example, a second bridge circuit formed of a plurality of switching elements connected in three phases by bridge connection and a rectifier element. Each switching element is, for example, a transistor such as a SiC MOSFET. The plurality of switching elements are high-side arm and low-side arm transistors 13a, 13b that form a pair in each phase.

The rectifier element is, for example, a reflux diode connected in parallel to each transistor 13a, 13b. The capacitor 13c for smoothing a voltage is connected in parallel to the second bridge circuit.

The second element module controls an operation of the rotary electric machine 14 by transmission and reception of electric power. For example, at the time of power running of the rotary electric machine 14, the second element module converts DC electric power input from DC terminals 13p, 13n of a positive electrode and a negative electrode into three-phase AC electric power and supplies the three-phase AC electric power from a three-phase AC terminal 13d to the rotary electric machine 14. The second element module generates a rotation drive force by sequentially commutating electric power supply to a three-phase stator winding of the rotary electric machine 14.

For example, at the time of regeneration of the rotary electric machine 14, the second element module converts the three-phase AC electric power input from the three-phase stator winding into DC electric power by the driving between ON (conduction) and OFF (cutoff) of the switching element of each phase synchronized with the rotation of the rotary electric machine 14. The second element module is capable of supplying the DC electric power converted from the three-phase AC electric power to the electric power storage device 11 via the storage electric power voltage conversion portion 12.

The rotary electric machine 14 is, for example, a three-phase AC brushless DC motor provided for traveling and driving of the vehicle. The rotary electric machine 14 includes a rotor having a field permanent magnet and a stator having a three-phase stator winding that generates a rotation magnetic field which rotates the rotor. The three-phase stator winding is connected to the three-phase AC terminal 13d of the electric power conversion portion 13.

The rotary electric machine 14 generates a rotation drive force by performing a power running operation using electric power supplied from the electric power conversion portion 13. For example, when the rotary electric machine 14 is connectable to a wheel of the vehicle, the rotary electric machine 14 generates a travel drive force by performing the power running operation using electric power supplied from the electric power conversion portion 13. The rotary electric machine 14 may generate electric power by performing a regeneration operation using a rotation power input from the wheel side of the vehicle. When the rotary electric machine 14 is connectable to the internal combustion engine of the vehicle, the rotary electric machine 14 may generate electric power using the power of the internal combustion engine.

The electric power reception portion 15 is connected to the reception electric power conversion portion 16. The electric power reception portion 15 receives electric power by a change in the high-frequency magnetic field transmitted from the electric power transmission portion 8, for example, by magnetic field coupling such as magnetic field resonance or electromagnetic induction. As shown in FIG. 3, the electric power reception portion 15 includes, for example, a resonance circuit formed of a secondary side coil 15a (electric power reception side coil), a secondary side resistance 15b, and a secondary side capacitor 15c that are connected in series. The electric power reception portion 15 includes, for example, a sensor such as a current sensor that detects a current Ir flowing through the resonance circuit.

The reception electric power conversion portion 16 shown in FIG. 1 and FIG. 2 is connected to the electric power conversion portion 13. The reception electric power conversion portion 16 includes a so-called full-bridgeless (or bridgeless and totem-pole) power factor correction (PFC) circuit that converts AC electric power into DC electric power. The so-called bridgeless PFC is a PFC that does not include a bridge rectifier using a plurality of diodes connected by bridge connection. The so-called totem-pole PFC is a PFC that includes a pair of switching elements having the same conductivity type connected (totem-pole connection) in series in the same direction.

The reception electric power conversion portion 16 includes, for example: a third bridge circuit formed of a plurality of switching elements connected in two phases by bridge connection and a rectifier element; and a capacitor for smoothing a voltage. Each switching element is, for example, a transistor such as a SiC MOSFET. The plurality of switching elements are high-side arm and low-side arm transistors 16a, 16b that form a pair in each phase. The rectifier element is, for example, a reflux diode connected in parallel to each transistor 16a, 16b. The capacitor 16c for smoothing a voltage is connected in parallel to the third bridge circuit.

For example, the electric power reception device 4 that includes the electric power reception portion 15 and the reception electric power conversion portion 16 receives electric power transmitted from the electric power transmission device 2 by controlling switching between ON (conduction) and OFF (cutoff) of each switching element of the reception electric power conversion portion 16 in response to information about a frequency of electric power transmission by the electric power transmission device 2.

The control device 17 integrally controls, for example, the drive control device 3, the electric power reception device 4, and the in-vehicle communication device 18 of the movable body such as a vehicle. The control device 17 is, for example, a software function unit that functions by a predetermined program being executed by a processor such as a CPU (Central Processing Unit). The software function unit is an ECU that includes the processor such as a CPU, a ROM (Read-Only Memory) that stores the program, a RAM (Random-Access Memory) that temporarily stores data, and an electronic circuit such as a timer. At least part of the control device 17 may be an integrated circuit such as a LSI (Large-Scale Integration).

For example, the control device 17 generates a control signal indicating a timing of driving each switching element to ON (conduction) and OFF (cutoff) and generates a gate signal for driving each switching element actually to ON and OFF on the basis of the control signal.

For example, by controlling switching of each switching element of the electric power reception device 4, the control device 17 performs the power factor correction of the input voltage and the input current while rectifying AC electric power received from the electric power transmission device 2 to DC electric power.

For example, the control device 17 controls an output in accordance with a target output by a synchronous rectification operation that synchronously drives the plurality of switching elements of the electric power reception device 4 to ON and OFF and a short-circuit operation that short-circuits the secondary side coil 15a.

For example, the control device 17 controls the synchronous rectification operation in accordance with the magnitude and the phase of a current generated in the electric power reception portion 15 by electric power transmitted from the electric power transmission device 2, that is, the current Ir flowing through the secondary side coil 15a. The control device 17 controls the plurality of switching elements of the reception electric power conversion portion 16 by soft switching of so-called zero voltage switching (ZVS). In the zero voltage switching (ZVS), after a voltage of both ends of each switching element is set to zero by the discharge of an output capacitance (parasitic capacitance) in an OFF state in a dead time period of each phase, turn-on (switching from an OFF state to an ON state) of each switching element is performed.

For example, the control device 17 controls the short-circuit operation by turning on only the low-side arm of each phase while continuing the synchronous rectification operation of the zero voltage switching (ZVS) at the high-side arm of each phase of the reception electric power conversion portion 16.

For example, the control device 17 sets a communication zone for communication and an electric power transmission zone for electric power transmission in a coupling zone in which a coupling degree between the primary side coil 8a of the electric power transmission device 2 and the secondary side coil 15a of the electric power reception device 4 is equal to or more than a predetermined degree in the vicinity of the electric power transmission device 2. For example, when receiving the key information by communication between the roadside communicator Ma and the in-vehicle communication device 18 before arriving at the coupling zone, the control device 17 transmits information relating to electric power transmission in the electric power transmission zone from the electric power reception device 4 to the electric power transmission device 2 in the communication zone prior to starting of electric power transmission by the electric power transmission device 2 in the electric power transmission zone.

Figure 4:
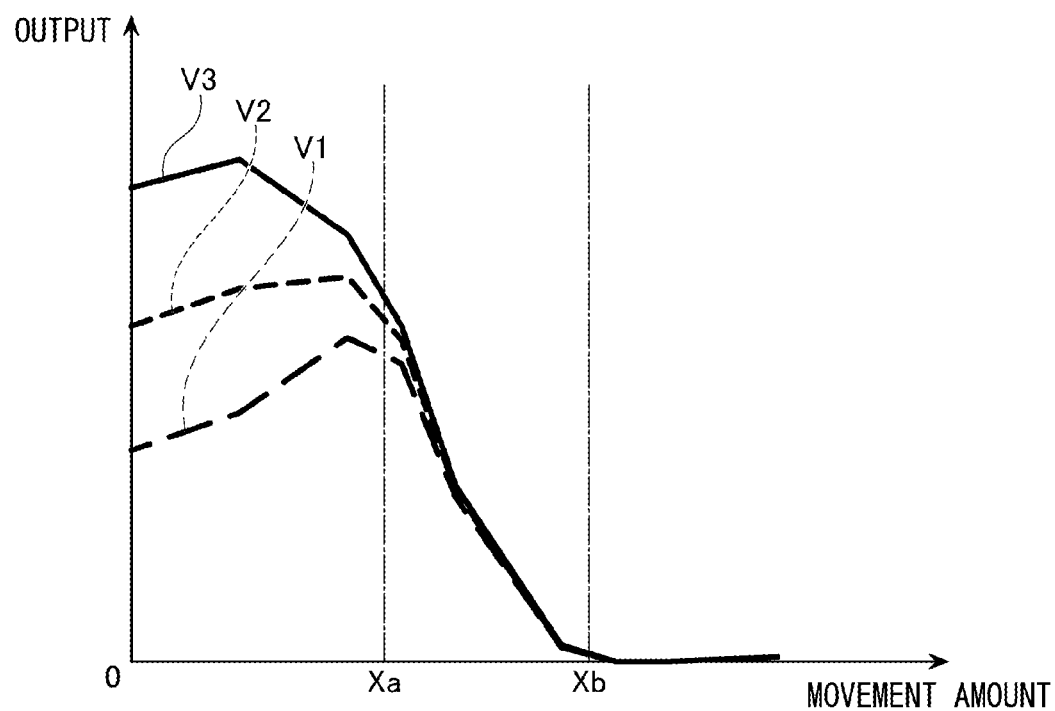
FIG. 4 is a view showing an example of a correspondence relationship between a relative movement amount between a primary side coil of an electric power transmission device and a secondary side coil of an electric power reception device and an output of electric power transmission at each voltage in the embodiment of the present invention.
Figure 5:
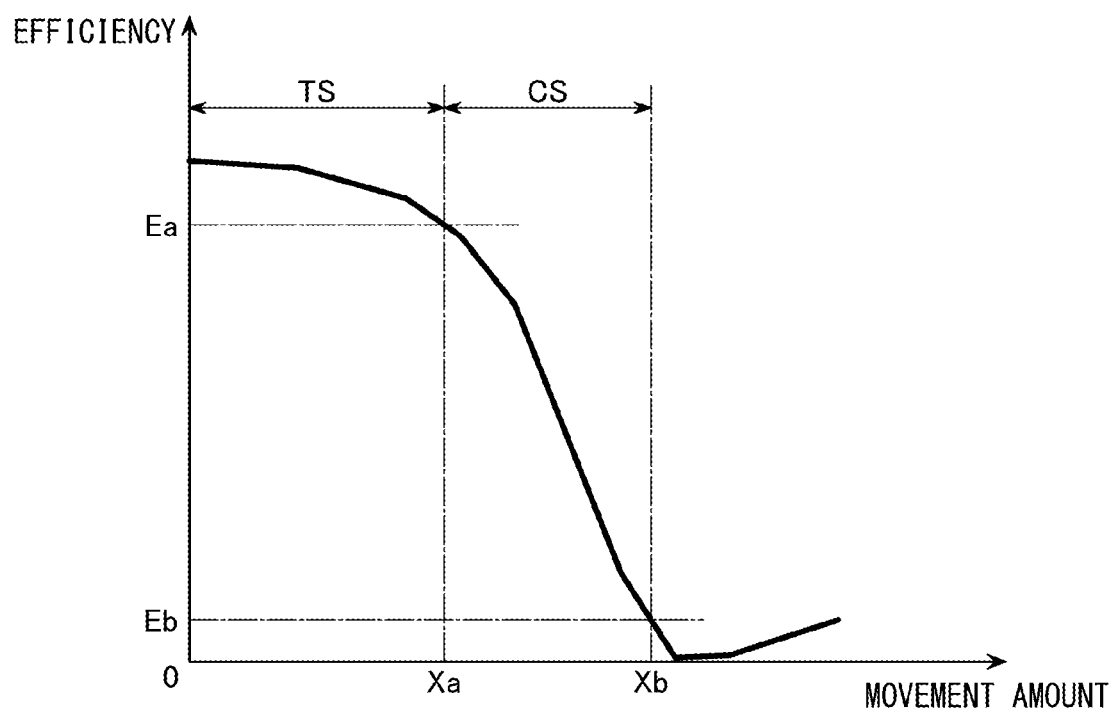
FIG. 5 is a view showing an example of a correspondence relationship between a relative movement amount between a primary side coil of an electric power transmission device and a secondary side coil of an electric power reception device and the efficiency of electric power transmission in the embodiment of the present invention.
Figure 6:
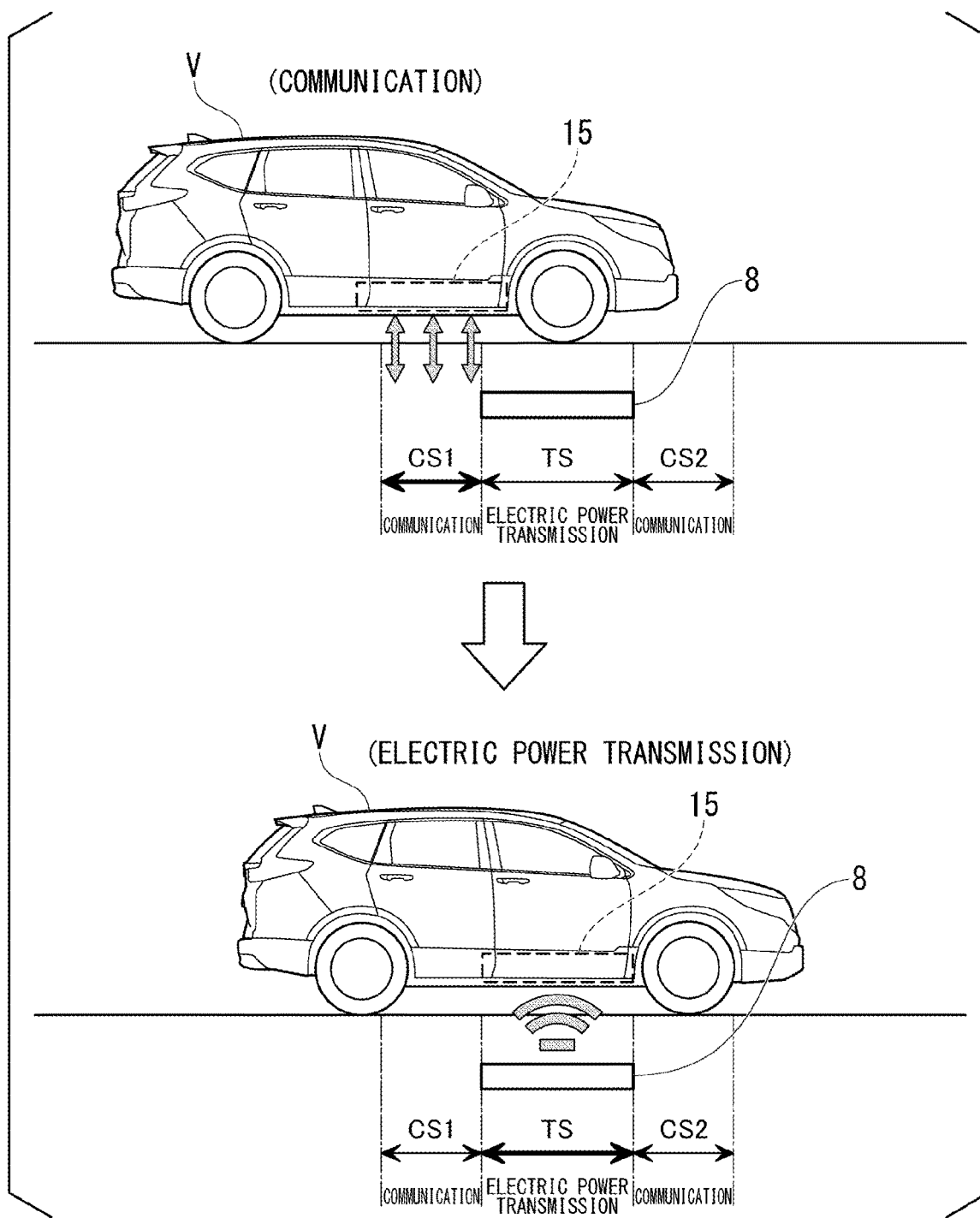
FIG. 6 is a view showing an example of an operation of communication and electric power transmission in association with the movement of a movable body (vehicle) in the embodiment of the present invention.

FIG. 4 is a view showing an example of a correspondence relationship between a relative movement amount between the primary side coil 8a of the electric power transmission device 2 and the secondary side coil 15a of the electric power reception device 4 and an output of electric power transmission at each voltage V1, V2, V3 in the embodiment. FIG. 5 is a view showing an example of a correspondence relationship between a relative movement amount between the primary side coil 8a of the electric power transmission device 2 and the secondary side coil 15a of the electric power reception device 4 and the efficiency of electric power transmission in the embodiment. FIG. 6 is a view showing an example of an operation of communication and electric power transmission in association with the movement of a movable body (for example, a vehicle V) in the embodiment.

As shown in FIG. 4 and FIG. 5, in accordance with the increase of the relative movement amount of the primary side coil 8a and the secondary side coil 15a from zero, the output and the efficiency of electric power transmission are changed in a decreasing trend. The state in which the movement amount is zero is, for example, a state in which center axis lines of the primary side coil 8a and the secondary side coil 15a become identical to each other or the like. The control device 17 defines, for example, the coupling zone in which the coupling degree between the primary side coil 8a and the secondary side coil 15a is equal to or more than the predetermined degree as a zone in which the efficiency of electric power transmission is equal to or more than a predetermined value (zero or the like). The control device 17 defines, in the coupling zone, a zone in which the efficiency of electric power transmission is equal to or more than a first predetermined value Ea (for example, 80% or the like), and the relative movement amount between the primary side coil 8a and the secondary side coil 15a is equal to or less than a first movement amount Xa corresponding to the first predetermined value Ea as an electric power transmission zone TS in which the coupling degree between the primary side coil 8a and the secondary side coil 15a is relatively large. The control device 17 defines, in the coupling zone, a zone in which the efficiency of electric power transmission is less than the first predetermined value Ea and is equal to or more than a second predetermined value Eb (for example, 0% or the like), and the relative movement amount between the primary side coil 8a and the secondary side coil 15a is larger than the first movement amount Xa and is equal to or less than a second movement amount Xb corresponding to the second predetermined value Eb as a communication zone CS in which the coupling degree between the primary side coil 8a and the secondary side coil 15a is relatively small.

The control device 17 transmits information relating to electric power transmission in the electric power transmission zone TS from the electric power reception device 4 to the electric power transmission device 2 by communication between the electric power transmission device 2 and the electric power reception device 4, for example, when the primary side coil 8a is present in the foremost communication zone CS of the coupling zone.

For example, as shown in FIG. 6, when a first communication zone CS1 and a second communication zone CS2 are set in front of and in the rear of the electric power transmission zone TS along a movement direction of the movable body (for example, the vehicle V), the control device 17 transmits information relating to electric power transmission from the electric power reception device 4 to the electric power transmission device 2 in the first communication zone CS1 which is a foremost communication zone CS. Examples of the information relating to electric power transmission include key information acquired from the roadside communicator Ma, the request frequency of electric power transmission, a target output (electric power consumption) for failsafe, and information relating to various abnormalities.

The request frequency of electric power transmission is set so as to prevent the decrease of the efficiency of electric power transmission and the output (electric power), for example, on the basis of a minimum ground height of the movable body, the mounting layout of the electric power reception device 4 in the movable body, and the like which are related to the distance between the primary side coil 8a and the secondary side coil 15a. The control device 17 may set the request frequency in accordance with the state of the electric power transmission between the electric power transmission device 2 and the electric power reception device 4.

For example, when the primary side coil 8a is present in an aftermost communication zone CS (for example, the second communication zone CS2 shown in FIG. 6 or the like) of the coupling zone, the control device 17 may transmit information indicating the stop of each of the electric power transmission in the electric power transmission zone TS and the communication in the communication zone CS from the electric power reception device 4 to the electric power transmission device 2 by communication between the electric power transmission device 2 and the electric power reception device 4.

For example, when receiving the key information by the communication between the roadside communicator Ma and the in-vehicle communication device 18, the control device 17 transmits information by performing electric power transmission from the electric power reception device 4 to the electric power transmission device 2 in the reception standby state as a transmission of a so-called PING signal in the communication zone CS of the coupling zone. The electric power reception device 4 communicates by a voltage induced in the primary side coil 8a of the electric power transmission device 2 by a magnetic field generated in the secondary side coil 15a by an electric power distribution switch operation by way of switching at the reception electric power conversion portion 16. The control device 17 generates digital signals of two levels which are so-called dominant and recessive levels, for example, by performing switching of a carrier wave for transmitting electric power in a contactless manner from the electric power reception device 4 to the electric power transmission device 2 at a predetermined duty ratio and thereby performs the PING transmission. The predetermined duty ratio is, for example, from a predetermined minimum to about 50%. The control device 17 may transmit information, for example, by amplitude modulation of the carrier wave by changing the switching duty ratio.

The control device 17 performs the PING transmission at a predetermined cycle, for example, from a few tens of microseconds to about a few milliseconds or the like, and when receiving a response signal to the PING transmission from the electric power transmission device 2, the control device 17 starts an electric power reception control for the electric power transmission from the electric power transmission device 2 in the electric power transmission zone TS.

The control device 17 sets the timing of the PING transmissions, for example, in accordance with information relating to the arrangement of the electric power transmission device 2 received from the roadside communicator Ma and the movement state (that is, the movement state of the electric power reception device 4) of the movable body (for example, the vehicle M) such that the communication (that is, mutual transmission and reception) between the electric power transmission device 2 and the electric power reception device 4 in the communication zone CS is appropriately completed. For example, the control device 17 sets a transmission cycle in accordance with the information about an arrangement interval of the plurality of electric power transmission portions 8 or the like and the speed (for example, a vehicle speed of the vehicle V or the like) of the movable body such that at least a predetermined time (one time or the like) of PING transmission is completed in the communication zone CS.

For example, even when the control device 17 authorizes the execution of the PING transmission in the communication zone CS, the control device 17 shifts to a standby state in which the execution of the PING transmission is stopped in a zone other than the communication zone CS. For example, in the standby state of the PING transmission, in association with the movement of the movable body, the control device 17 may start the execution of the PING transmission immediately before arriving at a foremost communication zone CS of the next coupling zone.

Hereinafter, as an operation of the contactless electric power transmission system 1, a process performed by the electric power transmission side control device 9 and the control device 17 is described.

Figure 7:
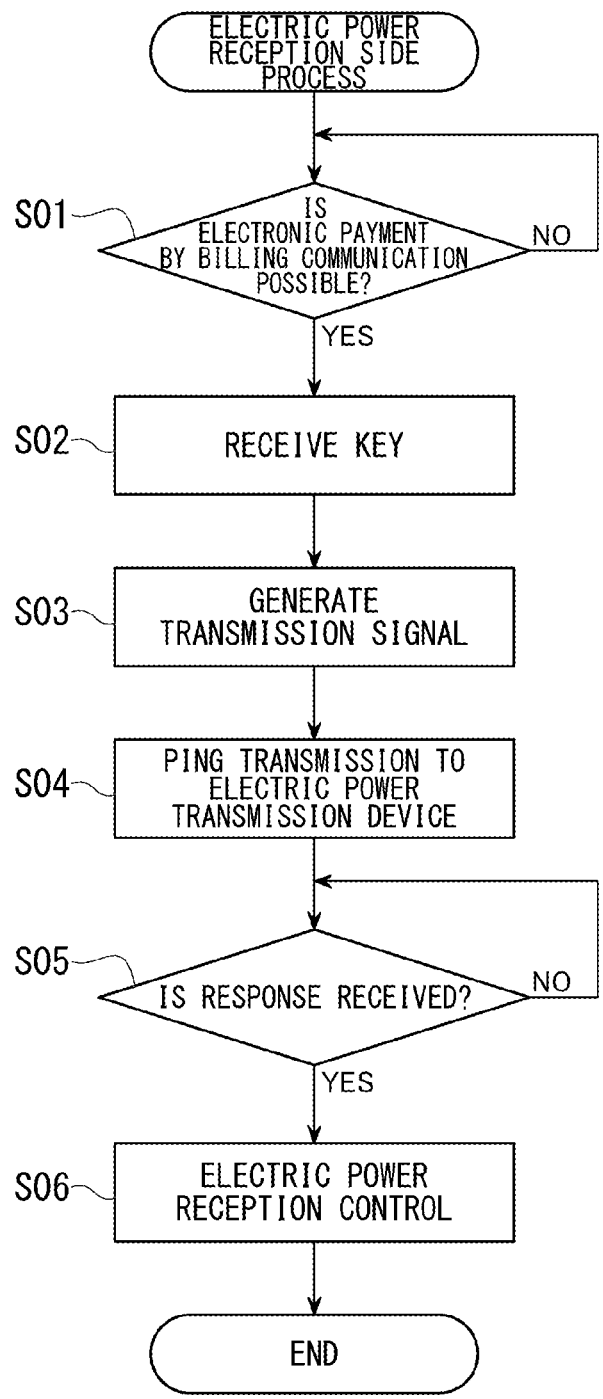
FIG. 7 is a flowchart showing an electric power reception side process of the contactless electric power transmission system in the embodiment of the present invention.

FIG. 7 is a flowchart showing an electric power reception side process performed by the control device 17 of the contactless electric power transmission system 1 in the embodiment.

First, in Step S01 shown in FIG. 7, the control device 17 determines whether or not electronic payment for electric power transmission from the electric power transmission device 2 to the movable body is possible by transmission and reception (billing communication) of information by a wireless communication between the roadside communicator Ma and the in-vehicle communication device 18. When the determination result is "NO", the control device 17 repeats the process of Step S01. On the other hand, when the determination result is "YES", the control device 17 advances the process to Step S02.

Then, in Step S02, the control device 17 acquires key information required for starting electric power transmission from the roadside communicator Ma.

Next, in Step S03, the control device 17 generates a signal for the PING transmission by electric power transmission from the electric power reception device 4 to the electric power transmission device 2.

Next, in Step S04, the control device 17 performs the PING transmission on a predetermined cycle in a foremost communication zone CS of a coupling zone.

Next, in Step S05, the control device 17 determines whether or not a response signal from the electric power transmission device 2 to the PING transmission is received. When the determination result is "NO", the control device 17 repeats the process of Step S05. On the other hand, when the determination result is "YES", the control device 17 advances the process to Step S06.

Then, in Step S06, the control device 17 starts an electric power reception control for the electric power transmission from the electric power transmission device 2 in the electric power transmission zone TS. Then, the control device 17 advances the process to the end.

Figure 8:
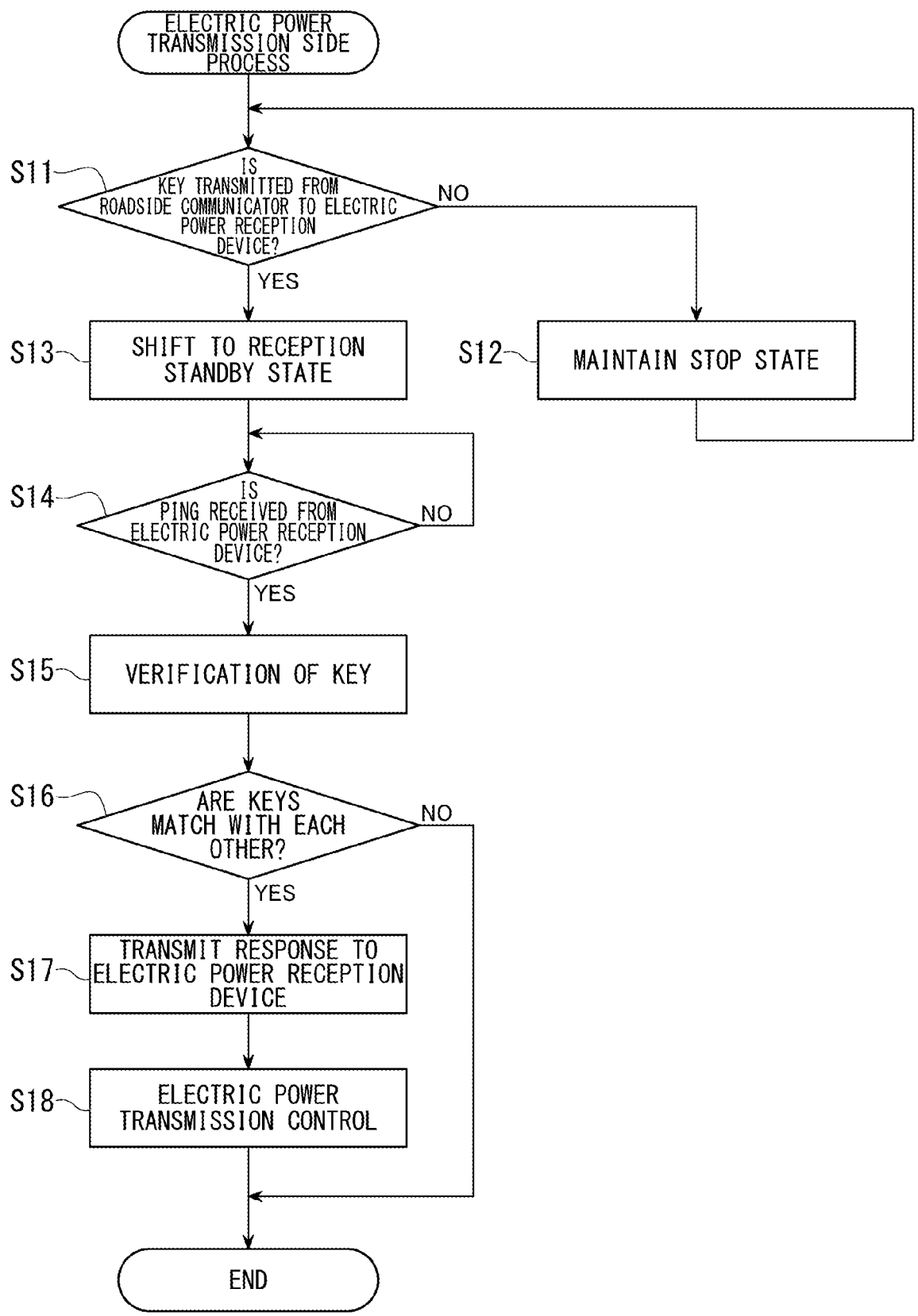
FIG. 8 is a flowchart showing an electric power transmission side process of the contactless electric power transmission system in the embodiment of the present invention.

FIG. 8 is a flowchart showing an electric power transmission side process performed by the electric power transmission side control device 9 of the contactless electric power transmission system 1 in the embodiment.

First, in Step S11 shown in FIG. 8, the electric power transmission side control device 9 determines whether or not the key information is transmitted from the roadside communicator Ma to the electric power reception device 4. When the determination result is "NO", the electric power transmission side control device 9 advances the process to Step S12. On the other hand, when the determination result is "YES", the electric power transmission side control device 9 advances the process to Step S13.

Then, in Step S12, the electric power transmission side control device 9 maintains the stop state of the electric power transmission device 2 and causes the process to return to Step S11.

Then, in Step S13, the electric power transmission side control device 9 shifts the electric power transmission device 2 from the stop state to the reception standby state.

Next, in Step S14, the electric power transmission side control device 9 determines whether or not the PING signal by the electric power transmission from the electric power reception device 4 to the electric power transmission device 2 is received in the foremost communication zone CS of the coupling zone.

When the determination result is "NO", the electric power transmission side control device 9 repeats the process of Step S14. On the other hand, when the determination result is "YES", the electric power transmission side control device 9 advances the process to Step S15.

Next, in Step S15, the electric power transmission side control device 9 performs verification between the key information received from the communication control device Mb and the key information received from the electric power reception device 4.

Next, in Step S16, the electric power transmission side control device 9 determines whether or not the key information received from the communication control device Mb and the key information received from the electric power reception device 4 match each other. When the determination result is "NO", the electric power transmission side control device 9 advances the process to the end. On the other hand, when the determination result is "YES", the electric power transmission side control device 9 advances the process to Step S17.

Next, in Step S17, the electric power transmission side control device 9 transmits a response signal to the PING transmission to the electric power reception device 4 by electric power transmission from the electric power transmission device 2 to the electric power reception device 4 in the communication zone CS.

Next, in Step S18, the electric power transmission side control device 9 starts, in the electric power transmission zone TS, an electric power transmission control for electric power transmission to the electric power reception device 4 at the request frequency received from the electric power reception device 4. Then, the control device 17 advances the process to the end.

As described above, according to the contactless electric power transmission system 1 of the embodiment, by including the control device 17 that transmits the information relating to the electric power transmission from the electric power reception device 4 to the electric power transmission device 2 in the communication zone CS prior to arriving at the electric power transmission zone TS, it is possible to ensure desired electric power and transmission efficiency.

For example, even when the time to pass through the electric power transmission zone TS is short since the speed of a movable body on which the electric power reception device 4 is mounted is high, the control device 17 can promptly start the electric power transmission in the electric power transmission zone TS by transmitting the information relating to the electric power transmission prior to arriving at the electric power transmission zone TS.

Since the control device 17 sets the timing (for example, a cycle, a frequency, and the like) of the communication in the communication zone CS in accordance with the movement state such as the speed of the movable body on which the electric power reception device 4 is mounted, the communication can be appropriately completed in the communication zone CS, and it is possible to prevent the increase of electric power consumption by preventing the excessive number of communications from being performed.

By including the control device 17 that transmits the information about the request frequency of the electric power transmission to the electric power transmission device 2, it is possible to ensure desired electric power and transmission efficiency. For example, even when a coupling coefficient is decreased due to a minimum ground height of the vehicle, the mounting layout of the electric power reception device 4, and the like which are related to a distance between the primary side coil 8a of the electric power transmission device 2 and the secondary side coil 15a of the electric power reception device 4, by a request frequency which offsets the variation of a mutual inductance, it is possible to prevent the decrease of the transmission electric power and the transmission efficiency.

By including the electric power transmission side control device 9 and the control device 17 that shift the electric power transmission device 2 to the reception standby state prior to arriving at the coupling zone, it is possible to promptly perform reception and verification of the key information in the communication zone CS. The electric power transmission device 2 is in the stop state before the control device 17 acquires the key information, and thereby, it is possible to prevent the increase of standby electric power.

Since the reception standby state of the electric power transmission device 2 is a state in which the primary side coil 8a is short-circuited by the transmission electric power conversion portion 7, the communication of information via a magnetic field from the electric power reception device 4 to the electric power transmission device 2 can be easily detected by a voltage induced in the primary side coil 8a.

Modification Example

Hereinafter, a modification example of the embodiment is described. The same portions as those of the embodiment described above are denoted by the same reference numerals, and descriptions thereof are omitted or simplified.

The above embodiment is described using an example in which the control device 17 sets a transmission cycle such that at least one PING transmission is completed in the communication zone CS; however, the embodiment is not limited thereto. For example, the control device 17 may set a transmission cycle in accordance with information about an arrangement interval of a plurality of electric power transmission portions 8 or the like and the speed (for example, a vehicle speed of the vehicle V or the like) of the movable body such that the PING transmissions of a number of times which is equal to or less than a predetermined upper limit number of times is completed. The control device 17 can prevent the increase of electric power consumption by regulating the number of times of PING transmissions in the communication zone CS.

The above embodiment is described using an example in which the communication system M constitutes an electronic toll collection system; however, the embodiment is not limited thereto. For example, the communication system M may be a system that simply communicates with the in-vehicle communication device 18 prior to communication and electric power transmission in a predetermined coupling zone.

The above embodiment is described using an example in which transmission and reception of the key information and information about the request frequency or the like are performed by electric power transmission between the electric power transmission device 2 and the electric power reception device 4; however, the embodiment is not limited thereto. For example, each of the electric power transmission device 2 and the electric power reception device 4 may include a communicator that performs a wireless communication with each other and may perform transmission and reception of the key information and information about the request frequency or the like via the communicators.

The above embodiment is described using an example in which the contactless electric power transmission system 1 includes the storage electric power voltage conversion portion 12 that converts an input-output electric power of the electric power storage device 11; however, the embodiment is not limited thereto. The storage electric power voltage conversion portion 12 may be omitted.

For example, in the case of a hybrid vehicle or the like that is driven using the electric power storage device 11 and an internal combustion engine as a power source, the drive control device 3 may include the storage electric power voltage conversion portion 12, and in the case of an electric automobile or the like that is driven using the electric power storage device 11 as a power source, the drive control device 3 may not include the storage electric power voltage conversion portion 12.

The embodiments of the present invention have been presented as examples and are not intended to limit the scope of the invention. The embodiments can be implemented in a variety of other modes, and various omissions, substitutions, and modifications can be made without departing from the scope of the invention. The embodiments and modifications thereof are included within the scope and gist of the invention and are also included within the scope of the invention described in the appended claims and equivalents thereof.

What is claimed is:

1. A contactless electric power transmission system, comprising:
   an electric power reception device having an electric power reception side coil that receives electric power transmitted in a contactless manner between the electric power reception side coil and an electric power transmission side coil of an electric power transmission device; and
   a control device that controls the electric power reception device,
   wherein the control device sets, in a coupling zone in which a coupling degree between the electric power transmission side coil and the electric power reception side coil is equal to or more than a predetermined degree, a communication zone in which the coupling degree is relatively small, and an electric power transmission zone in which the coupling degree is relatively large,
   transmits information relating to electric power transmission in the electric power transmission zone from the electric power reception device to the electric power transmission device by communication between the electric power transmission device and the electric power reception device when the electric power reception side coil is present in a foremost communication zone of the coupling zone,
   sets the information relating to the electric power transmission to have at least key information and information about a request frequency of the electric power transmission, and
   causes the electric power transmission device to perform, in the electric power transmission zone, the electric power transmission at the request frequency in response to verification of the key information by transmitting the information relating to the electric power transmission from the electric power reception device to the electric power transmission device in the foremost communication zone.

2. The contactless electric power transmission system according to claim 1,
   wherein the control device sets a timing of the communication between the electric power transmission device and the electric power reception device in the communication zone in accordance with a movement state of the electric power reception side coil.

3. The contactless electric power transmission system according to claim 2, comprising:
   a communication device in which communication with a communicator arranged externally is controlled by the control device,
   wherein the control device shifts the electric power transmission device from a stop state to a reception standby state of the information relating to the electric power transmission by acquiring the key information by the communication between the communicator and the communication device before the electric power reception side coil arrives at the coupling zone, and
   maintains the reception standby state for a period of time until verification of the key information is completed.

4. The contactless electric power transmission system according to claim 3,
   wherein the control device sets the reception standby state to a short-circuit state of the electric power transmission side coil, and
   in the communication between the electric power transmission device and the electric power reception device, communication is performed by a voltage induced in the electric power transmission side coil by a magnetic field generated in the electric power reception side coil by an electric power distribution switch operation of the electric power reception device.

5. The contactless electric power transmission system according to claim 1, comprising:
   a communication device in which communication with a communicator arranged externally is controlled by the control device,
   wherein the control device shifts the electric power transmission device from a stop state to a reception standby state of the information relating to the electric power transmission by acquiring the key information by the communication between the communicator and the communication device before the electric power reception side coil arrives at the coupling zone, and
   maintains the reception standby state for a period of time until verification of the key information is completed.

6. The contactless electric power transmission system according to claim 5,
   wherein the control device sets the reception standby state to a short-circuit state of the electric power transmission side coil, and
   in the communication between the electric power transmission device and the electric power reception device, communication is performed by a voltage induced in the electric power transmission side coil by a magnetic field generated in the electric power reception side coil by an electric power distribution switch operation of the electric power reception device.

7. A contactless electric power transmission system, comprising:
   an electric power reception device having an electric power reception side coil that receives electric power transmitted in a contactless manner between the electric power reception side coil and an electric power transmission side coil of an electric power transmission device; and
   a control device that controls the electric power reception device,
   wherein the control device
      sets, in a coupling zone in which a coupling degree between the electric power transmission side coil and the electric power reception side coil is equal to or more than a predetermined degree, a communication zone in which the coupling degree is relatively small, and an electric power transmission zone in which the coupling degree is relatively large,
      transmits information relating to electric power transmission in the electric power transmission zone from the electric power reception device to the electric power transmission device by communication between the electric power transmission device and the electric power reception device when the electric power reception side coil is present in a foremost communication zone of the coupling zone, and sets the information relating to the electric power transmission to have at least key information and information about a request frequency of the electric power transmission.

8. The contactless electric power transmission system according to claim 7, wherein the control device sets a timing of the communication between the electric power transmission device and the electric power reception device in the communication zone in accordance with a movement state of the electric power reception side coil.

\* \* \* \* \*